Patented Oct. 19, 1926.

1,603,499

UNITED STATES PATENT OFFICE.

JOHN A. WILSON, OF ELIZABETH, NEW JERSEY, ASSIGNOR TO DURATEX CORPORATION, OF NEWARK, NEW JERSEY, A CORPORATION OF NEW JERSEY.

NITROCELLULOSE FILM AND PROCESS OF MAKING THE SAME.

No Drawing.  Application filed October 22, 1920. Serial No. 418,849.

My invention relates to a new article of manufacture and the process of making the same and has for one of its objects the production of long thin sheets or films of nitrocellulose capable of being utilized in the manufacture of various commercial products.

The films produced in accordance with my invention are strong and have a high degree of flexibility and elasticity and being perfectly transparent, are particularly adapted for use as "lights" in the sides or curtains of a vehicle top, tent, or portable house, while the method of producing such films is simple, efficient and economical.

The films are capable of use in any place or manner in which celluloid films have heretofore been used. The films, according to my invention, however, are not celluloid, in that no camphor or camphor substitute is used and further have the advantage over celluloid films in ever maintaining their flexibility. They do not dry out and consequently crack as do the celluloid films, nor are they sticky or tacky.

In carrying out my invention, I make a composition, comprising nitrocellulose, any suitable solvent and diluent, and a non-drying vegetable oil. I may use a sufficient amount of any solvent having a boiling point higher than water. As a solvent I may use the tailings or last distillates of a solvent having a boiling point less than water, or I may use a solvent made by drying a mixture of such distillates and solvents and distillating them together. It is to be understood, however, that any solvents, diluents, and non-drying vegetable oil may be used.

I make the sheet or film of this solution by pouring or depositing the same on a flat, smooth surface or revolving or moving smooth surface upon which the film is formed by the evaporation of the solvents and from which surface they may be readily stripped, due to the oil used in the solution. As indicated, any desired apparatus may be employed, but from a practical standpoint I preferably produce films of unlimited length by the well-known method of depositing a coating on a continuously moving, smooth, metallic belt or carrier, or revolving drum, on which it is formed by the evaporation of the solvents and then continuously stripped and dried and wound into rolls.

The drying may be carried out by any well-known manner, preferably by heat in a closed space or by passing the film over proper number of steam heated drying cans.

It is essential, however, that the air used thruout this entire process be washed and filtered so that no dust particles or other foreign, undesirable matter be deposited in the solution or on the still somewhat plastic film. The evaporated solvents may be recovered by any usual condensation or absorption process and arrangement and again utilized.

It is to be observed that the solution I employ is free from and has no trace of any camphor, camphor-like substance, or camphor substitutes such as resin or the like. The vegetable oil used is a non-drying one and renders the film extremely flexible and pliable. As no camphor or the like is used, there can be no evaporation, no matter how gradual, of such substance, and consequently no gradual hardening or increasing brittleness of the film. The film produced in accordance with my invention will ever remain flexible, clear, and pliable. Nitrocellulose films, when made as celluloid, have a tendency to darken when ageing and turn to a straw color and so become more opaque. The oil used in my solution acts as a stabilizer for the nitrocellulose and so prevents this gradual discoloration.

Obviously, when I desire to color my films and still leave them transparent, I may add any suitable dye, and if I desire to render such a film colored, but translucent, then pigments in proper proportion are added.

Fresh, newly made celluloid films may be hermetically sealed in a coating of my solution deposited on both sides of the film. When thus sealed, the drying out of the celluloid, due to either the sublimation of the camphor or camphor-like substance, or the evaporation of the residual solvents, is prevented and so the celluloid remains as flexible and pliable as when originally made.

When used as a "light" for a vehicle curtain, a piece of film, made as I have described, may be secured to the edge of the opening in the fabric of the curtain in any suitable manner, as by sewing, clamping or riveting or cementing in place. A side curtain provided with such a film is less liable to tear and break out and remains more and ever flexible and pliable.

The vehicle curtain produced with such a film can be conveniently rolled or folded an infinite number of times without cracking the transparent portion, and due to the non-cracking feature, can be carried in a part of the car from which the usual celluloid containing side curtain is excluded because it must be handled gently due to the cracking characteristics.

Further it has been found that when sewing a "light" made of my film into a side curtain, a finer, smaller stitch may be used than when the usual celluloid transparent film is employed.

I am aware that the particular embodiments of my invention, which I have shown and described here, are susceptible of considerable variation without departing from the spirit thereof and, therefore, I desire to claim the same, broadly as well as specifically, as indicated by the appended claims.

What I claim as new and desire to procure by Letters Patent is:

1. As a new article of manufacture, a flexible, pliable film comprising a sheet of celluloid hermetically sealed with a coating consisting of nitrocellulose, a diluent and a vegetable oil.

2. As a new article of manufacture; a flexible, pliable film comprising a film of celluloid hermetically sealed with a coating consisting of nitrocellulose, a diluent and a non-drying vegetable oil.

3. As a new article of manufacture, a flexible, pliable film comprising a film of celluloid coated on both sides with a substance consisting of nitrocellulose, a diluent, and a vegetable oil.

4. As a new article of manufacture; a flexible, pliable film comprising a film of celluloid coated on both sides with a substance consisting of nitrocellulose, a diluent and a non-drying vegetable oil.

5. The process of retaining camphor in celluloid which consists in coating newly made celluloid with a thin sheet of solution containing nitrocelluose, a solvent, a diluent and a non-drying vegetable oil and subsequently removing the solvent.

6. The process of retaining camphor in celluloid which consists in sealing said celluloid in a coating formed of a solution of nitrocellulose, a solvent, a diluent and a non-drying vegetable oil and subsequently removing the solvent.

7. The process of retaining camphor in celluloid which consists in covering said celluloid with a sheet of solution containing nitrocelluose and a non-drying vegetable oil.

In testimony whereof, I affix my signature.

JOHN A. WILSON.